(12) United States Patent
Mehrotra

(10) Patent No.: US 8,447,591 B2
(45) Date of Patent: May 21, 2013

(54) FACTORIZATION OF OVERLAPPING TRANFORMS INTO TWO BLOCK TRANSFORMS

(75) Inventor: Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 12/130,862

(22) Filed: May 30, 2008

(65) Prior Publication Data

US 2009/0299754 A1    Dec. 3, 2009

(51) Int. Cl.
*G10L 19/02*    (2006.01)

(52) U.S. Cl.
USPC .......... 704/204; 704/203; 704/205; 704/500; 704/502; 704/504

(58) Field of Classification Search
None
See application file for complete search history.

(56) References Cited

U.S. PATENT DOCUMENTS

| | | |
|---|---|---|
| 4,698,672 A | 10/1987 | Chen et al. |
| 4,754,492 A | 6/1988 | Malvar |
| 5,297,236 A | 3/1994 | Antill et al. |
| 5,311,310 A | 5/1994 | Jozawa et al. |
| 5,384,849 A | 1/1995 | Jeong |
| 5,805,739 A | 9/1998 | Malvar et al. |
| 5,822,000 A | 10/1998 | Yoon |
| 5,850,294 A | 12/1998 | Apostolopoulos et al. |
| 5,859,788 A | 1/1999 | Hou |
| 5,933,541 A | 8/1999 | Kutka et al. |
| 5,970,173 A | 10/1999 | Lee et al. |
| 5,973,755 A | 10/1999 | Gabriel |
| 5,982,459 A | 11/1999 | Fandrianto et al. |
| 5,999,656 A | 12/1999 | Zandi et al. |
| 6,011,625 A | 1/2000 | Glass |
| 6,029,126 A | 2/2000 | Malvar |
| 6,064,776 A | 5/2000 | Kikuchi et al. |
| 6,073,153 A | 6/2000 | Malvar |
| 6,101,279 A | 8/2000 | Nguyen et al. |
| 6,115,689 A | 9/2000 | Malvar |
| 6,154,762 A | 11/2000 | Malvar |
| 6,219,458 B1 | 4/2001 | Zandi et al. |
| 6,249,610 B1 | 6/2001 | Matsumoto et al. |
| 6,253,165 B1 | 6/2001 | Malvar |
| 6,307,887 B1 | 10/2001 | Gabriel |
| 6,324,560 B1 | 11/2001 | Malvar |
| 6,337,881 B1 | 1/2002 | Chaddha |
| 6,370,502 B1 | 4/2002 | Wu et al. |
| 6,377,916 B1 | 4/2002 | Hardwick |

(Continued)

FOREIGN PATENT DOCUMENTS

| | | |
|---|---|---|
| AU | 7351001 | 1/2002 |
| EP | 1202219 | 5/2002 |

(Continued)

OTHER PUBLICATIONS

U.S. Appl. No. 60/341,674, filed Dec. 2001, Lee et al.

(Continued)

*Primary Examiner* — Leonard Saint Cyr
(74) *Attorney, Agent, or Firm* — Klarquist Sparkman, LLP

(57) ABSTRACT

An audio encoder/decoder uses a combination of an overlap windowing transform and block transform that have reversible implementations to provide a reversible, integer-integer form of a lapped transform. The reversible lapped transform permits both lossy and lossless transform domain coding of an audio signal having variable subframe sizes.

20 Claims, 6 Drawing Sheets

U.S. PATENT DOCUMENTS

| | | | |
|---|---|---|---|
| 6,393,061 | B1 | 5/2002 | Owechko |
| 6,393,156 | B1 | 5/2002 | Nguyen et al. |
| 6,421,464 | B1 | 7/2002 | Tran et al. |
| 6,487,574 | B1 | 11/2002 | Malvar |
| 6,496,795 | B1 | 12/2002 | Malvar |
| 6,728,315 | B2 | 4/2004 | Haskell et al. |
| 6,728,316 | B2 | 4/2004 | Enficiaud et al. |
| 6,763,068 | B2 | 7/2004 | Oktem |
| 6,771,828 | B1 | 8/2004 | Malvar |
| 6,771,829 | B1 | 8/2004 | Topiwala et al. |
| 6,832,232 | B1 | 12/2004 | Hus et al. |
| 6,865,229 | B1 | 3/2005 | Pronkine |
| 7,006,699 | B2 | 2/2006 | Malvar |
| 7,027,654 | B1 | 4/2006 | Ameres et al. |
| 7,050,504 | B2 | 5/2006 | Joch et al. |
| 7,106,797 | B2 | 9/2006 | Malvar |
| 7,110,610 | B2 | 9/2006 | Malvar |
| 7,116,834 | B2 | 10/2006 | Malvar |
| 7,120,297 | B2 | 10/2006 | Simard |
| 7,155,065 | B1 | 12/2006 | Malvar |
| 7,167,522 | B2 | 1/2007 | Webb |
| 7,181,403 | B2 | 2/2007 | Wu et al. |
| 7,275,036 | B2 | 9/2007 | Geiger et al. |
| 7,315,822 | B2 | 1/2008 | Li |
| 7,412,102 | B2 | 8/2008 | Srinivasan et al. |
| 7,428,342 | B2 | 9/2008 | Tu et al. |
| 7,460,993 | B2 | 12/2008 | Chen et al. |
| 7,471,726 | B2 | 12/2008 | Srinivasan |
| 7,471,850 | B2 | 12/2008 | Srinivasan |
| 7,551,789 | B2 | 6/2009 | Tu et al. |
| 2002/0110280 | A1 | 8/2002 | Prakash et al. |
| 2002/0118748 | A1 | 8/2002 | Inomata et al. |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0185439 | A1 | 10/2003 | Malvar |
| 2003/0187634 | A1* | 10/2003 | Li ............... 704/200.1 |
| 2003/0206582 | A1 | 11/2003 | Srinivasan |
| 2004/0047512 | A1 | 3/2004 | Handley et al. |
| 2004/0057631 | A1 | 3/2004 | Kim |
| 2004/0167757 | A1 | 8/2004 | Strujs |
| 2004/0170302 | A1 | 9/2004 | Museth et al. |
| 2005/0013359 | A1 | 1/2005 | Srinivasan |
| 2005/0083216 | A1 | 4/2005 | Lin |
| 2005/0231396 | A1* | 10/2005 | Dunn ............... 341/50 |
| 2005/0286795 | A1 | 12/2005 | Zhang |
| 2006/0114993 | A1 | 6/2006 | Xiong et al. |
| 2006/0133682 | A1* | 6/2006 | Tu et al. ........... 382/248 |
| 2006/0133684 | A1* | 6/2006 | Srinivasan et al. ...... 382/250 |
| 2006/0291734 | A1* | 12/2006 | Hou ............... 382/240 |
| 2006/0291735 | A1* | 12/2006 | Hou ............... 382/240 |
| 2006/0291736 | A1* | 12/2006 | Hou ............... 382/250 |
| 2006/0293881 | A1* | 12/2006 | Hou ............... 704/203 |
| 2007/0036224 | A1 | 2/2007 | Srinivasan |
| 2008/0075377 | A1 | 3/2008 | Topiwala et al. |
| 2008/0137982 | A1 | 6/2008 | Nakajima |
| 2008/0198936 | A1 | 8/2008 | Srinivasan |

FOREIGN PATENT DOCUMENTS

| | | |
|---|---|---|
| EP | 1 672 929 | 6/2006 |
| JP | 6-290262 | 10/1994 |
| JP | 11-088701 | 3/1999 |
| JP | 11-203271 | 7/1999 |
| JP | 2002-182693 | 6/2002 |
| JP | 2002-304624 | 10/2002 |
| JP | 2003-283840 | 10/2003 |
| JP | 2003-298846 | 10/2003 |
| JP | 2003-324757 | 11/2003 |
| JP | 2004-201047 | 7/2004 |
| KR | 10-2004-0050888 | 6/2004 |
| KR | 10-2006-0083125 | 7/2006 |
| KR | 10-2006-0092826 | 8/2006 |
| RU | 2194361 | 12/2002 |
| WO | WO 02/07438 | 1/2002 |
| WO | WO 03/038752 | 5/2003 |
| WO | WO 03/053066 | 6/2003 |
| WO | WO 2005/033965 | 4/2005 |
| WO | WO 2007/021615 A3 | 2/2007 |
| WO | WO 2008/057308 | 5/2008 |

OTHER PUBLICATIONS

U.S. Appl. No. 60/488,710, filed Jul. 2003, Srinivasan et al.

Ahmed et al., "Discrete Cosine Transform," *IEEE Transactions on Computers*, C-23 (Jan. 1974), pp. 90-93.

Apostolopoulos et al., "Post-processing for very low bit-rate video compression," *IEEE Trans. Image Processing*, vol. 8, pp. 1125-1129 (Aug. 1999).

Bhaskaran et al., "Image and Video Compression Standards Algorithms and Architectures," 2nd ed., 1997, pp. 192-194.

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

de Queiroz et al., "Lapped transforms for image compression," *The Handbook on Transforms and Data Compression*, CRC Press, pp. 197-265 (Oct. 2000).

de Queiroz et al., "Time-Varying Lapped Transforms and Wavelet Packets," *IEEE Transactions on Signal Processing*, vol. 41, No. 12, pp. 3293-3305 (1993).

Goel et al., "Pre-processing for MPEG Compression Using Adaptive Spatial Filtering," *Proceedings of 1995 IEEE International Conference on Consumer Electronics*, 1995, pp. 246-247.

"H.264 & IPTV Over DSL—Enabling New Telco Revenue Opportunities," *White Paper*, Intel/Envivio, available at http://www.envivio.com/images/products/H264whitepaper.pdf (May 15, 2004), 12 pp.

International Search Report for PCT/US04/28969, completed Jul. 11, 2006, 4 pages.

International Search Report and Written Opinion for PCT/US06/30565, completed Apr. 15, 2007, 6 pp.

ISO/IEC, "ISO/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC 14496-2, "Coding of Audio-Visual Object—Part 2: Visual," Third Edition, pp. 1-727, (Jun. 2004).

ISO/IEC JTC1/SC29/WG11 N4668, "Coding of Moving Pictures and Audio," Title: MPEG-4 Overview—(V.21—Jeju Version), Editor: Rob Koenen (rob.koenen@m4if.org), available at http://www.chiariglione.org/mpeg/standards/mpeg-4/mpeg-4.htm (Mar. 2002), 66 pp.

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Jain, "Fundamentals of Digital Image Processing," Chapters 2, 5, and 11, Prentice Hall, 189 pp. (1989).

Joint Video Team (JVT) of ISO/IEC MPEG & ITU-T VCEG, "Joint Final Committee Draft (JFCFD) of Joint Video Specification," JVT-D157, 207 pp. (Aug. 2002).

Klausutis et al., "Variable Block Size Adaptive Lapped Transform-based Image Coding," *1997 International Conference on Image Processing (ICIP '97)*, vol. 3, pp. 686-689 (1997).

Malvar, "Biorthogonal and Nonuniform Lapped Transforms for Transform Coding with Reduced Blocking and Ringing Artifacts,"

appeared in *IEEE Transactions on Signal Processing, Special Issue on Multirate Systems, Filter Banks, Wavelets, and Applications*, vol. 46, 29 pp. (1998).

Malvar, "Fast Progressive Image Coding without Wavelets", IEEE Data Compression Conference, Snowbird, Utah, 10 pp. (Mar. 2000).

Malvar, "Lapped Transforms for Efficient Transform/Subband Coding," *IEEE Transactions on Acoustics, Speech and Signal Processing*, vol. 38, No. 6, pp. 969-978 (1990).

Malvar, "Signal Processing With Lapped Transforms," Norwood, MA: Artech House, pp. 175-219, 264-273, and 353-357 (1992).

Malvar, "Signal Processing with Lapped Transforms," pp. 143-173, and 265-273 (1992).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Ostermann et al., "Video Coding with H.264/AVC", IEEE Circuits and Systems Magazine, First Quarter 2004 (retrieved on Apr. 14, 2007), retrieved from the internet URL:http://ieeexplore.ieee.org, 22 pp.

Paeth, "A Fast Algorithm for General Raster Rotation," *Proceedings of Graphics Interface '86*, pp. 77-81, May 1986.

Park et al., "A post processing method for reducing quantization effects in low bit-rate moving picture coding," *IEEE Trans. Circuits Syst.*, Video Technol., vol. 9, pp. 161-171 (Feb. 1999).

Printouts of FTP directories from http://ftp3.itu.ch, 8 pp. (downloaded from the World Wide Web on Sep. 20, 2005), 8 pp.

Proposed SMPTE Standard for Television: VC-1 Compressed Video Bitstream Format and Decoding Process, pp. 1-500, (Aug. 2005).

Rao et al., "Techniques and Standards for Image, Video, and Audio Coding," Englewood Cliffs, NJ: Prentice-Hall (1996), 21 pp.

Reader, "History of MPEG Video Compression—Ver. 4.0," 99 pp. (document marked Dec. 16, 2003).

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Tanaka et al., "A Rotation Method for Raster Image Using Skew Transformation," *Proc IEEE Conf on Computer Vision and Pattern Recognition*, pp. 272-277, Jun. 1986.

Tran et al., "Lapped Transform Based Video Coding," *Proc. SPIE Applicat. Digital Image Processing XXIV*, San Diego, CA, pp. 319-333 (Aug. 2001).

Tran, "Lapped Transform via Time-Domain Pre- and Post-Processing," *2001 Conference on Information Sciences and Systems*, The Johns Hopkins University (Mar. 21-23, 2001), 6 pp.

Tran et al., "Lapped Transform via Time-Domain Pre- and Post-Filtering," *IEEE Transactions on Signal Processing*, vol. 51, No. 6, pp. 1557-1571 (Jun. 2003).

Tu et al., "Context-Based Entropy Coding of Block Transform Coefficients for Image Processing," *IEEE Transactions on Image Processing*, vol. 11, No. 11, pp. 1271-1283 (Nov. 2002).

Wien, "Variable Block-Size Transforms for Hybrid Video Coding," Dissertation, 182 pp. (Feb. 2004).

International Search Report for PCT/US2009/044983 dated Jan. 7, 2010, 10 pp.

Malvar, "Extended Lapped Transforms: Fast Algorithms and Applications," ICASSP, vol. 3, pp. 1797-1800, 14-17, Apr. 1991.

Adams, "Generalized Reversible Integer-to-Integer Transform Framework," *2003 IEEE Pacific Rim Conference on Communications, Computers, and Signal Processing*, vol. 2, Aug. 2003, pp. 1000-1003.

Hao et al., "Matrix Factorizations for Reversible Integer Mapping," *IEEE Transactions on Signal Processing*, vol. 49, Issue 10, Oct. 2001, pp. 2314-2324.

Arai et al., "A Fast DCT-SQ Scheme for Images," the Trans. of the IEICE, vol. E 71, No. 11, pp. 1095-1097 (Nov. 1988).

Cham, "Development of integer cosine transforms by the principle of dyadic symmetry," IEEE Proc., vol. 136, Pt. 1, No. 4, pp. 276-282 (Aug. 1989).

Chen et al., "A Fast Computational Algorithm for the Discrete Cosine Transform," IEEE Trans. on Communications, vol. COM-25, No. 9, pp. 1004-1009 (Sep. 1977).

Cheng et al., "New family of lapped biorthogonal transform via lifting steps," IEEE Proc. Vision, Image and Signal Processing, vol. 149, No. 2, pp. 91-96 (Apr. 2002).

Fukuma et al., "Lossless 8-point fast discrete cosine transform using lossless hadamard transform," Technical Report of IEICE, vol. 99, No. 399, pp. 37-44 (Oct. 29, 1999).

Gangaputra et al., "Adaptive Pre- and Post-Filtering for Block Based Systems," IEEE Int'l Conf. on Acoustics, Speech, and Signal Processing, vol. 4, pp. IV-3297 through IV-3300 (May 2002).

Hohl, "An 8×8 Discrete Cosine Transform Implementation on the TMS320C25 or the TMS320C30," Texas Instruments Application Report SPRA115, pp. 1-25 (1990) http://focus.ti.com/lit/an/spra115/spra115.pdf [Downloaded from the World Wide Web on Dec. 28, 2005].

Hui et al., "An Integer Hierarchy Lapped Biorthogonal Transform via Lifting Steps and Application in Image Coding," IEEE Int'l Conf. on Signal Processing, vol. 1, pp. 664-667 (Aug. 2002).

Intel Corporation, "Using Streaming SIMD Extensions in a Fast DCT Algorithm for MPEG Encoding," Version 1.2, 11 pp. (Jan. 1999).

Intel Corporation, "Using MMX™ Instructions in a Fast iDCT Algorithm for MPEG Decoding," 21 pp. (Mar. 1996).

List et al., "Adaptive deblocking filter," IEEE Trans. on Circuits and Systems for Video Technology, vol. 13, No. 7, pp. 614-619 (Jul. 2003).

Malvar, "Lapped Biorthogonal Transforms for Transform Coding with Reduced Blocking and Ringing Artifacts," IEEE Int'l Conf. on Acoustics, Speech, and Signal Processing, vol. 3, pp. 2421-2424 (Apr. 1997).

Muramatsu et al., "The two-dimensional lapped Hadamard transform," IEEE Proc. on Circuits and Systems, vol. 5, pp. 86-89 (May 1998).

Murata et al., "Fast 2D IDCT Implementation with Multimedia Instructions for a Software MPEG2 Decoder," IEEE Conf. Acoustics, Speech and Signal Processing, vol. 5, 4 pp. (May 1998).

Srinivasan et al., "Windows Media Video 9: overview and applications," Signal Processing Image Communication, vol. 19, No. 9, pp. 851-875 (Oct. 2004).

Tran et al., "Regularity-constrained pre- and post-filtering for block DCT-based systems," IEEE Trans. on Signal Processing, vol. 51, No. 10, pp. 2568-2581 (Oct. 2003).

Wang et al., "Interlace Coding Tools for H.26L Video Coding," ITU, VCEG-O37, 20 pp. (Nov. 2001).

Chen et al., "Integer Reversible Transformation to Make JPEG Lossless," IEEE Int'l Conf. on Signal Processing, vol. 1, pp. 835-838 (Aug. 2004).

Chen et al., "*M*-Channel Lifting Factorization of Perfect Reconstruction Filter Banks and Reversible *M*-Band Wavelet Transforms," *IEEE Trans. on Circuits and Systems II: Analog and Digital Signal Processing*, vol. 50, No. 12, pp. 963-976 (Dec. 2003).

Geiger et al., "IntMDCT—A Link Between Perceptual and Lossless Audio Coding," *IEEE Int'l Conf. on Acoustics, Speech, and Signal Processing*, vol. 2, 4 pp (May 2002).

Hao et al., "Comparative Study of Color Transforms for Image Coding and Derivation of Integer Reversible Color Transform," *IEEE Int'l Conf. on Pattern Recognition*, vol. 3, pp. 224-227 (Sep. 2000).

ISO/IEC, "An integer reversible color transform," ISO/IEC JTC1/SC29/WG1 N1479, 6 pp. (Nov. 1999).

Joint Video Team (JVT) of ISO/IEC MPEG & ITU-T VCEG, "New Invertible Integer Color Transforms Based on Lifting Steps and Coding of 4:4:4 Video," JVT-I015r3, 16 pp. (Sep. 2003).

Kim et al., "A New Color Transform for RGB Coding," *Int'l Conf. on Image Processing*, pp. 107-110 (Oct. 2004).

Li, "Low Noise Reversible MDCT (RMDCT) and Its Application in Progressive-to-Lossless Embedded Audio Coding," *IEEE Trans. on Signal Processing*, vol. 53, No. 5 (May 2005).

Shui et al., "*M*-Band Biorthogonal Interpolating Wavelets via Lifting Scheme," *IEEE Trans. on Signal Processing*, vol. 52, No. 9, pp. 2500-2512 (Sep. 2004).

Srinivasan, "Modulo Transforms an Alternative to Lifting," MSR-TR-2004-130, 29 pp. (document marked Jan. 10, 2005).

Srinivasan, "Reversible Image Rotations with Modulo Transforms," *IEEE Image Processing*, vol. 2, pp. 137-140 (Sep. 2005).

Extended European Search Report dated Jun. 8, 2012, from European Patent Application No. 09759019.4, 8 pp.

Groder, "Modeling and Synthesis of the HD Photo Compression Algorithm," <http://hdl.handle.net/1850/7118>, Dept. of Computer Engineering, Rochester Institute of Technology, 115 pages (Aug. 2008).

Kwan et al., "A Complete Image Compression Scheme Based on Overlapped Block Transform with Post-Processing," EURASIP Journal on Applied Signal Processing, vol. 2006, Article ID 10968, pp. 1-15 (Jan. 2006).

Srinivasan et al., "HD Photo: a new image coding technology for digital photography," Proceedings of SPIE, vol. 6696, pp. 66960A-66960A-19, Jan. 1, 2007.

Wien, "Variable Block-Size Transforms for H.264/AVC," IEEE Trans. on Circuits and Systems for Video Technology, vol. 13, No. 7, pp. 604-613 (Jul. 2003).

* cited by examiner

Software 180 implementing audio encoder
and/or decoder

FACTORIZATION OF OVERLAPPING TRANFORMS INTO TWO BLOCK TRANSFORMS

BACKGROUND

With the introduction of portable digital media players, the compact disk for music storage and audio delivery over the Internet, it is now common to store, buy and distribute music and other audio content in digital audio formats. The digital audio formats empower people to enjoy having hundreds or thousands of music songs available on their personal computers (PCs) or portable media players.

Perceptual Transform Coding

The coding of audio utilizes coding techniques that exploit various perceptual models of human hearing. For example, many weaker tones near strong ones are masked so they do not need to be coded. In traditional perceptual audio coding, this is exploited as adaptive quantization of different frequency data. Perceptually important frequency data are allocated more bits and thus finer quantization and vice versa.

For example, transform coding is conventionally known as an efficient scheme for the compression of audio signals. The input audio is digitally time sampled. In transform coding, a block of the input audio samples is transformed (e.g., via the Modified Discrete Cosine Transform or MDCT, which is the most widely used), processed, and quantized. The quantization of the transformed coefficients is performed based on the perceptual importance (e.g. masking effects and frequency sensitivity of human hearing), such as via a scalar quantizer.

When a scalar quantizer is used, the importance is mapped to relative weighting, and the quantizer resolution (step size) for each coefficient is derived from its weight and the global resolution. The global resolution can be determined from target quality, bit rate, etc. For a given step size, each coefficient is quantized into a level which is zero or non-zero integer value.

At lower bitrates, there are typically a lot more zero level coefficients than non-zero level coefficients. They can be coded with great efficiency using run-length coding, which may be combined with an entropy coding scheme such as Huffman coding.

Overlapping Transforms and Variable Window Frame Sizes

Many audio compression systems utilize the Modulated Lapped Transform (MLT, also known as Modified Discrete Cosine Transform or MDCT) to perform the time-frequency analysis in audio transform coding. MLT reduces blocking artifacts introduced into the reconstructed audio signal by quantization. More particularly, when non-overlapping blocks are independently transform coded, quantization errors will produce discontinuities in the signal at the block boundaries upon reconstruction of the audio signal at the decoder. For audio, a periodic clicking effect is heard.

The MLT reduces the blocking effect by overlapping blocks. In the MLT, a "window" of 2M samples from two consecutive blocks undergoes a modulated cosine transform. M transform coefficients are returned. The window is then shifted by M samples and the next set of M transform coefficients is computed. Thus, each window overlaps the last M samples of the previous window. The overlap enhances the continuity of the reconstructed samples despite the alterations of transform coefficients due to quantization.

Some audio compression systems vary the size of window over time to accommodate the changing nature of the audio. Audio coders typically partition the input audio signal into fixed-sized "frames," each of which is a unit of coding (e.g., coding tables and/or parameters may be sent in a header section of each frame). In audio compression systems using time-varying MLT, each frame may contain one or more "windows" of variable size, where each window is a unit of the MLT. In general, larger windows are beneficial to coding efficiency, whereas smaller size windows provide better time resolution. Accordingly, the decisions of where and what windows sizes to employ are critical to compression performance and auditory quality of the encoded signal.

One problem in audio coding is commonly referred to as "pre-echo." Pre-echo occurs when the audio undergoes a sudden change (referred to as a "transient"). In transform coding, particular frequency coefficients commonly are quantized (i.e., reduced in resolution). When the transform coefficients are later inverse-transformed to reproduce the audio signal, this quantization introduces quantization noise that is spread over the entire block in the time domain. This inherently causes rather uniform smearing of noise within the coding frame. The noise, which generally is tolerable for some part of the frame, can be audible and disastrous to auditory quality during portions of the frame where the masking level is low. In practice, this effect shows up most prominently when a signal has a sharp attack immediately following a region of low energy, hence the term "pre-echo." "Post-echo" that occurs when the signal transition from high to low energy is less of a problem to perceptible auditory quality due to a property of the human auditory system.

Overlapped Transforms And Lossless Coding

Overlapping transforms also can be used for lossless coding. Many lossless coding techniques operate on audio signal data in the time domain. However, lossless coding also can be performed in the frequency domain, by simply performing entropy coding or other lossless coding of the transform coefficients resulting after application of the lapped transform without quantization. Such frequency domain lossless coding enables lossy and lossless compression versions of an audio signal to be more readily derived together. But, frequency domain lossless compression requires the transform to be reversible. Further for consistent computations as is needed to make the transform reversible, the transform should have an integer implementation.

Reversible integer-integer transforms pose a difficulty in that they require implementations using square transform matrices with a determinant of 1, which is not compatible for overlapping transform designs whose implementation uses rectangular sub-blocks in the transform matrix. Previously known reversible overlapping transforms also have typically required the same subframe configuration for all subframes of the audio signal, which is not compatible with audio codecs that employ variable subframe sizes, such as to reduce pre-echo as discussed above.

In previous reversible transform implementations, transforms such as MDCT and MLT are treated as 2N×N transforms, where the 2N×N transform is made reversible. While this procedure is fine when all subframes are of the same size, they do not work particularly well when subframe sizes vary. In addition, overlapped orthogonal transforms have an implementation which is hard to understand and modify.

SUMMARY

The following Detailed Description concerns various audio encoding/decoding techniques and tools for lossless audio compression in the transform domain, using overlapped transforms with variable subframe size. The techniques use an implementation of a reversible integer-integer overlapped transforms for variable frame sizes, which are formed by decomposing a transform such as the modulated lapped transform into a combination of two shifted block transforms, one of which is an overlapping transform and the other of which is a block transform (such as a standard DCT of any type).

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

Various techniques and tools for representing, coding, and decoding audio information are described. These techniques and tools facilitate the creation, distribution, and playback of high quality audio content, even at very low bitrates.

The various techniques and tools described herein may be used independently. Some of the techniques and tools may be used in combination (e.g., in different phases of a combined encoding and/or decoding process).

Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

Much of the detailed description addresses representing, coding, and decoding audio information. Many of the techniques and tools described herein for representing, coding, and decoding audio information can also be applied to video information, still image information, or other media information sent in single or multiple channels.

I. Computing Environment

Figure 1:
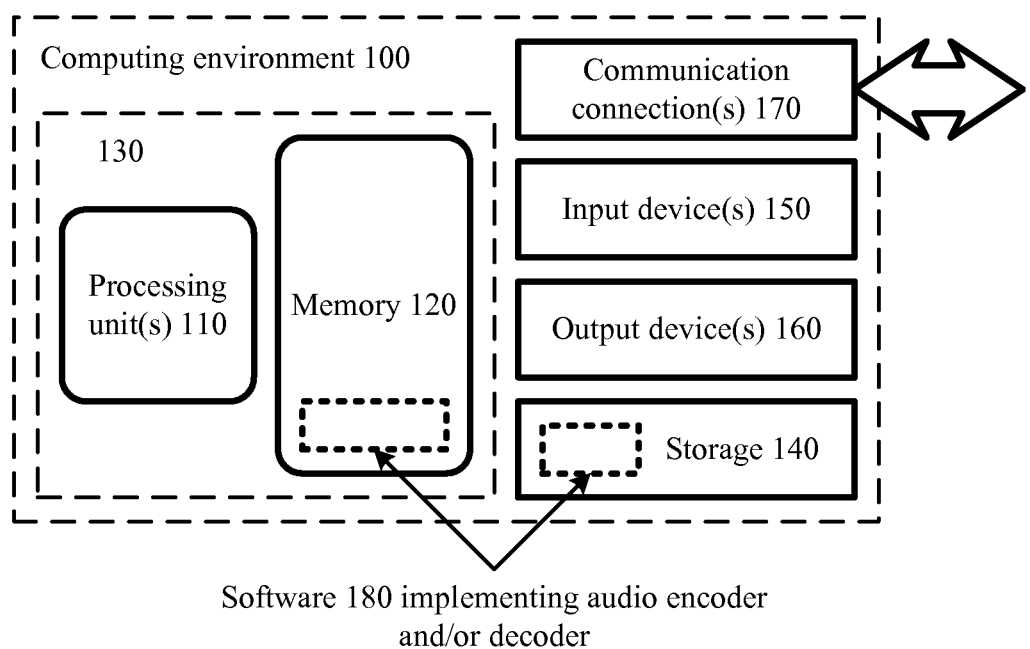
FIG. 1 is a block diagram of a generalized operating environment in conjunction with which various described embodiments may be implemented.

FIG. 1 illustrates a generalized example of a suitable computing environment 100 in which described embodiments may be implemented. The computing environment 100 is not intended to suggest any limitation as to scope of use or functionality, as described embodiments may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The processing unit also can comprise a central processing unit and co-processors, and/or dedicated or special purpose processing units (e.g., an audio processor). The memory 120 may be volatile memory (e.g., registers, cache, RAM), non-volatile memory (e.g., ROM, EEPROM, flash memory), or some combination of the two. The memory 120 stores software 180 implementing one or more audio processing techniques and/or systems according to one or more of the described embodiments.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for software executing in the computing environment 100 and coordinates activities of the components of the computing environment 100.

The storage 140 may be removable or non-removable, and includes magnetic disks, magnetic tapes or cassettes, CDs, DVDs, or any other medium which can be used to store information and which can be accessed within the computing environment 100. The storage 140 stores instructions for the software 180.

The input device(s) 150 may be a touch input device such as a keyboard, mouse, pen, touchscreen or trackball, a voice input device, a scanning device, or another device that provides input to the computing environment 100. For audio or video, the input device(s) 150 may be a microphone, sound card, video card, TV tuner card, or similar device that accepts audio or video input in analog or digital form, or a CD or DVD that reads audio or video samples into the computing environment. The output device(s) 160 may be a display, printer, speaker, CD/DVD-writer, network adapter, or another device that provides output from the computing environment 100.

The communication connection(s) 170 enable communication over a communication medium to one or more other computing entities. The communication medium conveys information such as computer-executable instructions, audio or video information, or other data in a data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 100, computer-readable media include memory 120, storage 140, and combinations of any of the above.

Embodiments can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like "determine," "receive," and "perform" to describe computer operations in a computing environment. These terms are high-level abstractions for operations performed by a computer, and should not be confused with acts performed by a human being. The actual computer operations corresponding to these terms vary depending on implementation.

II. Example Encoders and Decoders

Figure 2:
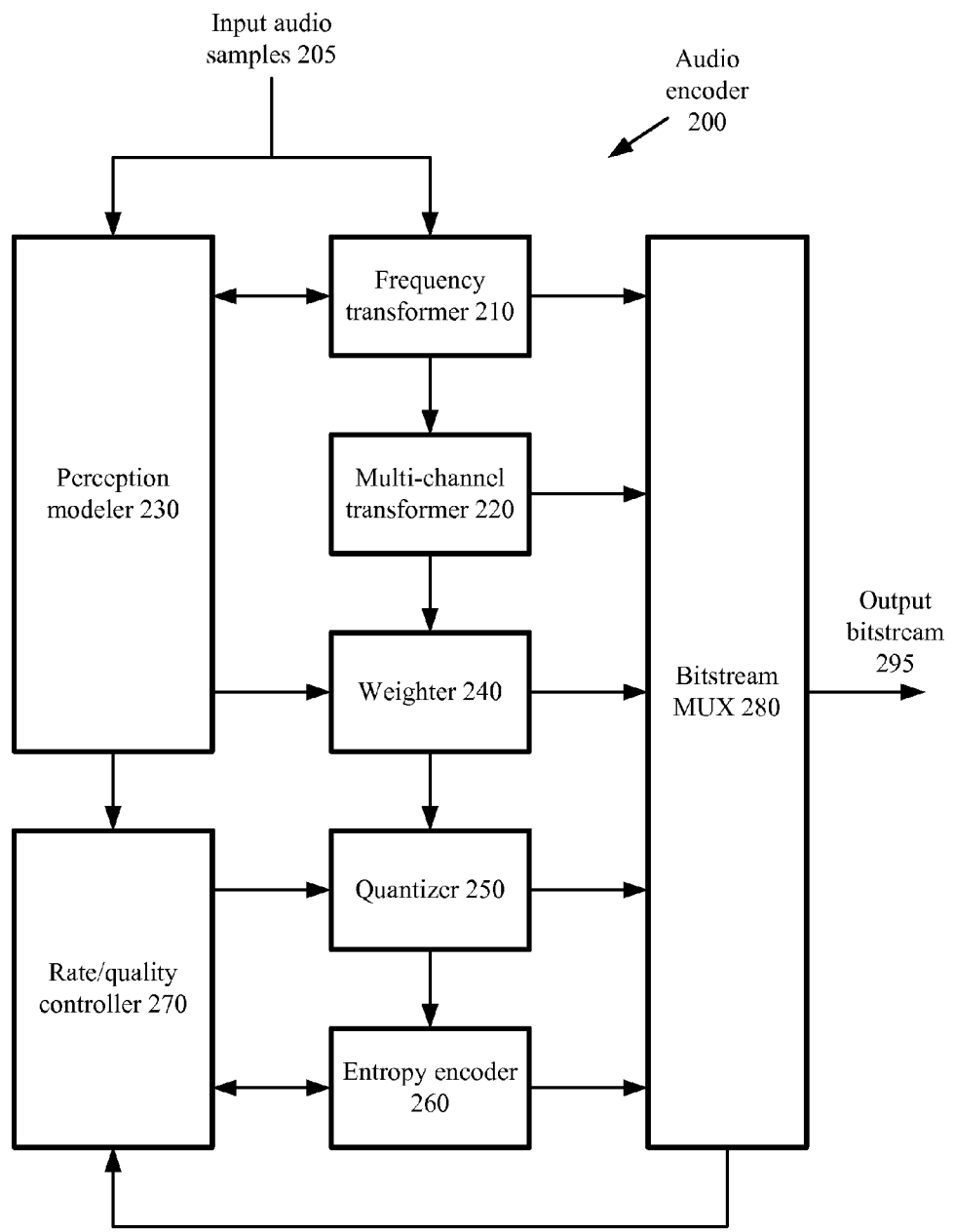
FIGS. 2, 3, 4, and 5 are block diagrams of generalized encoders and/or decoders in conjunction with which various described embodiments may be implemented.
Figure 3:
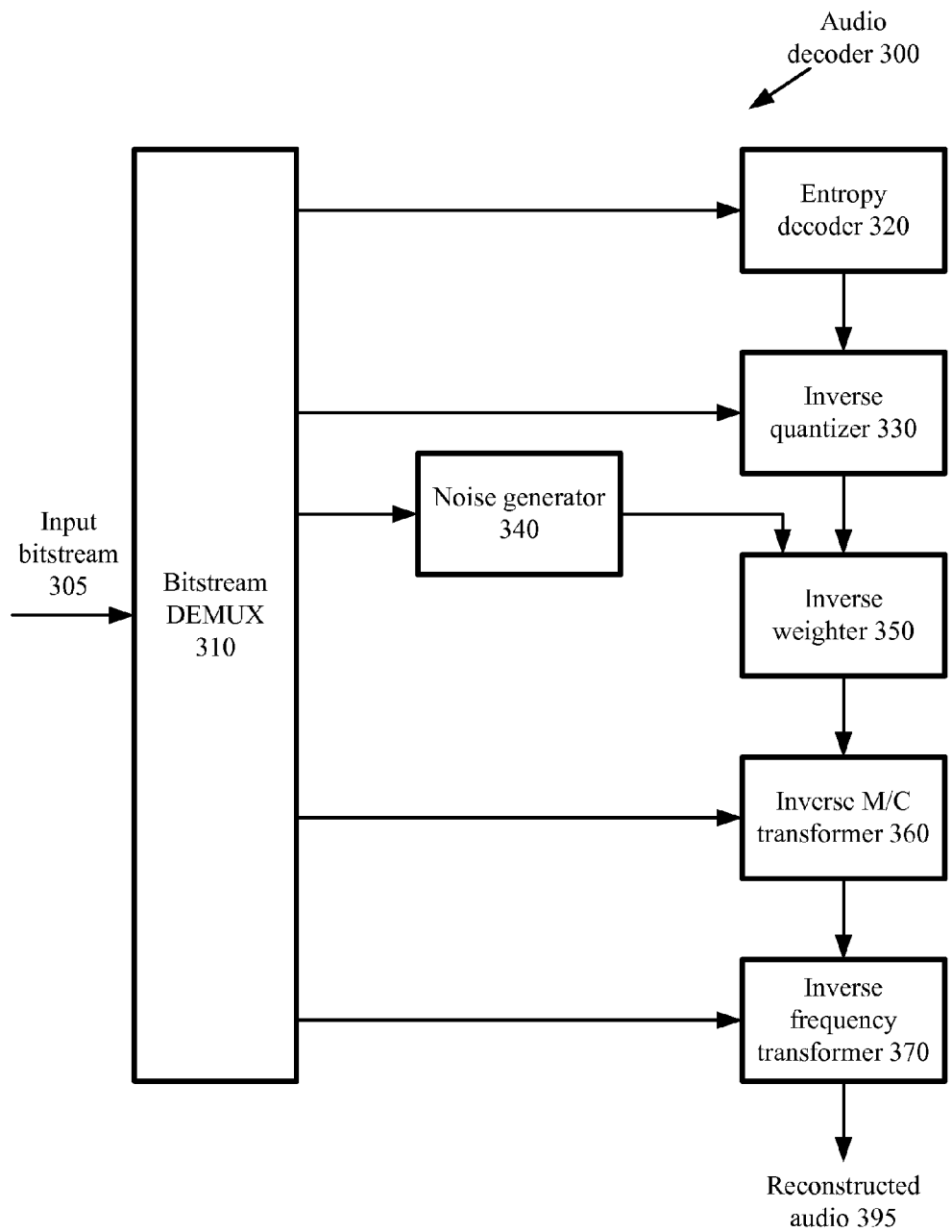

FIG. 2 shows a first audio encoder 200 in which one or more described embodiments may be implemented. The encoder 200 is a transform-based, perceptual audio encoder 200. FIG. 3 shows a corresponding audio decoder 300.

Figure 4:
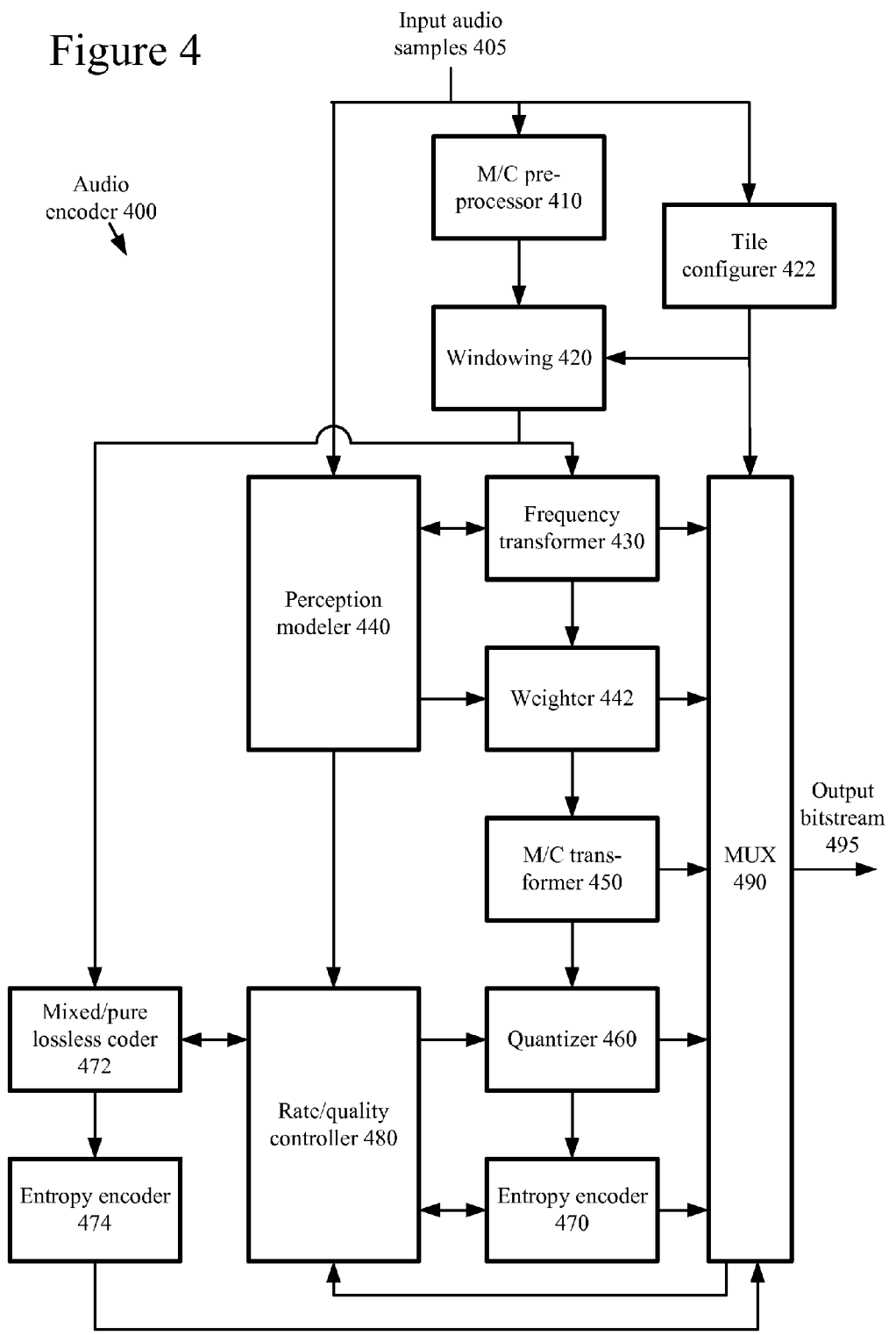
Figure 5:
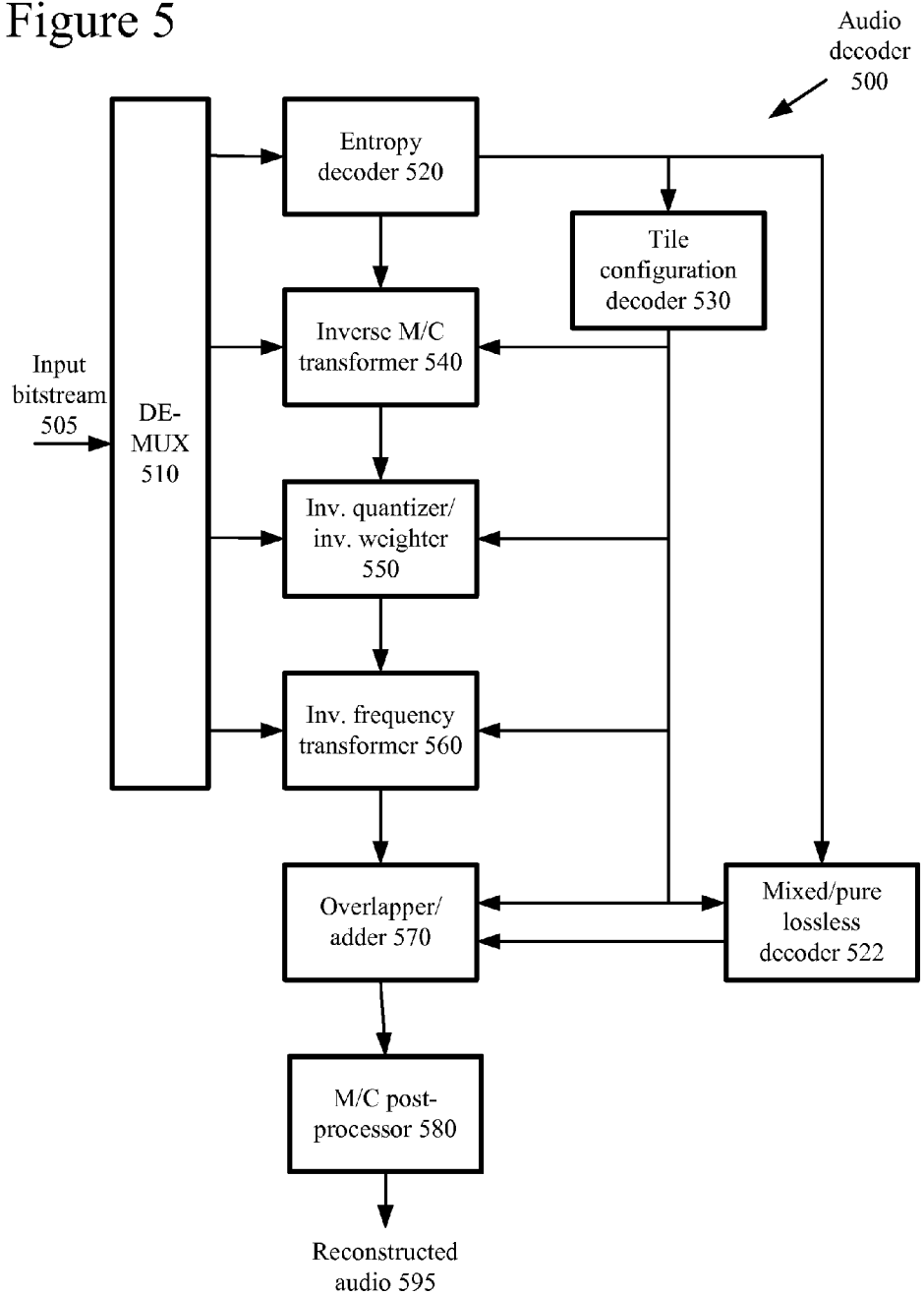

FIG. 4 shows a second audio encoder 400 in which one or more described embodiments may be implemented. The encoder 400 is again a transform-based, perceptual audio encoder, but the encoder 400 includes additional modules, such as modules for processing multi-channel audio. FIG. 5 shows a corresponding audio decoder 500.

Though the systems shown in FIGS. 2 through 5 are generalized, each has characteristics found in real world systems. In any case, the relationships shown between modules within the encoders and decoders indicate flows of information in the encoders and decoders; other relationships are not shown for the sake of simplicity. Depending on implementation and the type of compression desired, modules of an encoder or decoder can be added, omitted, split into multiple modules, combined with other modules, and/or replaced with like modules. In alternative embodiments, encoders or decoders with different modules and/or other configurations process audio data or some other type of data according to one or more described embodiments.

A. First Audio Encoder

The encoder 200 receives a time series of input audio samples 205 at some sampling depth and rate. The input audio samples 205 are for multi-channel audio (e.g., stereo) or mono audio. The encoder 200 compresses the audio samples 205 and multiplexes information produced by the various modules of the encoder 200 to output a bitstream 295 in a compression format such as a WMA format, a container format such as Advanced Streaming Format ("ASF"), or other compression or container format.

The frequency transformer 210 receives the audio samples 205 and converts them into data in the frequency (or spectral) domain. For example, the frequency transformer 210 splits the audio samples 205 of frames into sub-frame blocks, which can have variable size to allow variable temporal resolution. Blocks can overlap to reduce perceptible discontinuities between blocks that could otherwise be introduced by later quantization. The frequency transformer 210 applies to blocks a time-varying Modulated Lapped Transform ("MLT"), modulated DCT ("MDCT"), some other variety of MLT or DCT, or some other type of modulated or non-modulated, overlapped or non-overlapped frequency transform, or uses sub-band or wavelet coding. The frequency transformer 210 outputs blocks of spectral coefficient data and outputs side information such as block sizes to the multiplexer ("MUX") 280.

For multi-channel audio data, the multi-channel transformer 220 can convert the multiple original, independently coded channels into jointly coded channels. Or, the multi-channel transformer 220 can pass the left and right channels through as independently coded channels. The multi-channel transformer 220 produces side information to the MUX 280 indicating the channel mode used. The encoder 200 can apply multi-channel rematrixing to a block of audio data after a multi-channel transform.

The perception modeler 230 models properties of the human auditory system to improve the perceived quality of the reconstructed audio signal for a given bitrate. The perception modeler 230 uses any of various auditory models and passes excitation pattern information or other information to the weighter 240. For example, an auditory model typically considers the range of human hearing and critical bands (e.g., Bark bands). Aside from range and critical bands, interactions between audio signals can dramatically affect perception. In addition, an auditory model can consider a variety of other factors relating to physical or neural aspects of human perception of sound.

The perception modeler 230 outputs information that the weighter 240 uses to shape noise in the audio data to reduce the audibility of the noise. For example, using any of various techniques, the weighter 240 generates weighting factors for quantization matrices (sometimes called masks) based upon the received information. The weighting factors for a quantization matrix include a weight for each of multiple quantization bands in the matrix, where the quantization bands are frequency ranges of frequency coefficients. Thus, the weighting factors indicate proportions at which noise/quantization error is spread across the quantization bands, thereby controlling spectral/temporal distribution of the noise/quantization error, with the goal of minimizing the audibility of the noise by putting more noise in bands where it is less audible, and vice versa.

The weighter 240 then applies the weighting factors to the data received from the multi-channel transformer 220.

The quantizer 250 quantizes the output of the weighter 240, producing quantized coefficient data to the entropy encoder 260 and side information including quantization step size to the MUX 280. In FIG. 2, the quantizer 250 is an adaptive, uniform, scalar quantizer. The quantizer 250 applies the same quantization step size to each spectral coefficient, but the quantization step size itself can change from one iteration of a quantization loop to the next to affect the bitrate of the entropy encoder 260 output. Other kinds of quantization are non-uniform, vector quantization, and/or non-adaptive quantization.

The entropy encoder 260 losslessly compresses quantized coefficient data received from the quantizer 250, for example, performing run-level coding and vector variable length coding. The entropy encoder 260 can compute the number of bits spent encoding audio information and pass this information to the rate/quality controller 270.

The controller 270 works with the quantizer 250 to regulate the bitrate and/or quality of the output of the encoder 200. The controller 270 outputs the quantization step size to the quantizer 250 with the goal of satisfying bitrate and quality constraints.

In addition, the encoder 200 can apply noise substitution and/or band truncation to a block of audio data.

The MUX 280 multiplexes the side information received from the other modules of the audio encoder 200 along with the entropy encoded data received from the entropy encoder 260. The MUX 280 can include a virtual buffer that stores the bitstream 295 to be output by the encoder 200.

B. First Audio Decoder

The decoder 300 receives a bitstream 305 of compressed audio information including entropy encoded data as well as side information, from which the decoder 300 reconstructs audio samples 395.

The demultiplexer ("DEMUX") 310 parses information in the bitstream 305 and sends information to the modules of the decoder 300. The DEMUX 310 includes one or more buffers to compensate for short-term variations in bitrate due to fluctuations in complexity of the audio, network jitter, and/or other factors.

The entropy decoder 320 losslessly decompresses entropy codes received from the DEMUX 310, producing quantized spectral coefficient data. The entropy decoder 320 typically applies the inverse of the entropy encoding techniques used in the encoder.

The inverse quantizer 330 receives a quantization step size from the DEMUX 310 and receives quantized spectral coefficient data from the entropy decoder 320. The inverse quantizer 330 applies the quantization step size to the quantized frequency coefficient data to partially reconstruct the frequency coefficient data, or otherwise performs inverse quantization.

From the DEMUX 310, the noise generator 340 receives information indicating which bands in a block of data are noise substituted as well as any parameters for the form of the noise. The noise generator 340 generates the patterns for the indicated bands, and passes the information to the inverse weighter 350.

The inverse weighter 350 receives the weighting factors from the DEMUX 310, patterns for any noise-substituted bands from the noise generator 340, and the partially reconstructed frequency coefficient data from the inverse quantizer 330. As necessary, the inverse weighter 350 decompresses weighting factors. The inverse weighter 350 applies the weighting factors to the partially reconstructed frequency coefficient data for bands that have not been noise substituted. The inverse weighter 350 then adds in the noise patterns received from the noise generator 340 for the noise-substituted bands.

The inverse multi-channel transformer 360 receives the reconstructed spectral coefficient data from the inverse weighter 350 and channel mode information from the DEMUX 310. If multi-channel audio is in independently coded channels, the inverse multi-channel transformer 360 passes the channels through. If multi-channel data is in jointly coded channels, the inverse multi-channel transformer 360 converts the data into independently coded channels.

The inverse frequency transformer 370 receives the spectral coefficient data output by the multi-channel transformer 360 as well as side information such as block sizes from the DEMUX 310. The inverse frequency transformer 370 applies the inverse of the frequency transform used in the encoder and outputs blocks of reconstructed audio samples 395.

C. Second Audio Encoder

With reference to FIG. 4, the encoder 400 receives a time series of input audio samples 405 at some sampling depth and rate. The input audio samples 405 are for multi-channel audio (e.g., stereo, surround) or mono audio. The encoder 400 compresses the audio samples 405 and multiplexes information produced by the various modules of the encoder 400 to output a bitstream 495 in a compression format such as a WMA Pro format, a container format such as ASF, or other compression or container format.

The encoder 400 selects between multiple encoding modes for the audio samples 405. In FIG. 4, the encoder 400 switches between a mixed/pure lossless coding mode and a lossy coding mode. The lossless coding mode includes the mixed/pure lossless coder 472 and is typically used for high quality (and high bitrate) compression. The lossy coding mode includes components such as the weighter 442 and quantizer 460 and is typically used for adjustable quality (and controlled bitrate) compression. The selection decision depends upon user input or other criteria.

For lossy coding of multi-channel audio data, the multi-channel pre-processor 410 optionally re-matrixes the time-domain audio samples 405. For example, the multi-channel pre-processor 410 selectively re-matrixes the audio samples 405 to drop one or more coded channels or increase inter-channel correlation in the encoder 400, yet allow reconstruction (in some form) in the decoder 500. The multi-channel pre-processor 410 may send side information such as instructions for multi-channel post-processing to the MUX 490.

The windowing module 420 partitions a frame of audio input samples 405 into sub-frame blocks (windows). The windows may have time-varying size and window shaping functions. When the encoder 400 uses lossy coding, variable-size windows allow variable temporal resolution. The windowing module 420 outputs blocks of partitioned data and outputs side information such as block sizes to the MUX 490.

In FIG. 4, the tile configurer 422 partitions frames of multi-channel audio on a per-channel basis. The tile configurer 422 independently partitions each channel in the frame, if quality/bitrate allows. This allows, for example, the tile configurer 422 to isolate transients that appear in a particular channel with smaller windows, but use larger windows for frequency resolution or compression efficiency in other channels. This can improve compression efficiency by isolating transients on a per channel basis, but additional information specifying the partitions in individual channels is needed in many cases. Windows of the same size that are co-located in time may qualify for further redundancy reduction through multi-channel transformation. Thus, the tile configurer 422 groups windows of the same size that are co-located in time as a tile.

The frequency transformer 430 receives audio samples and converts them into data in the frequency domain, applying a transform such as described above for the frequency transformer 210 of FIG. 2. The frequency transformer 430 outputs blocks of spectral coefficient data to the weighter 442 and outputs side information such as block sizes to the MUX 490. The frequency transformer 430 outputs both the frequency coefficients and the side information to the perception modeler 440.

The perception modeler 440 models properties of the human auditory system, processing audio data according to an auditory model, generally as described above with reference to the perception modeler 230 of FIG. 2.

The weighter 442 generates weighting factors for quantization matrices based upon the information received from the perception modeler 440, generally as described above with reference to the weighter 240 of FIG. 2. The weighter 442 applies the weighting factors to the data received from the frequency transformer 430. The weighter 442 outputs side information such as the quantization matrices and channel weight factors to the MUX 490. The quantization matrices can be compressed.

For multi-channel audio data, the multi-channel transformer 450 may apply a multi-channel transform to take advantage of inter-channel correlation. For example, the multi-channel transformer 450 selectively and flexibly applies the multi-channel transform to some but not all of the channels and/or quantization bands in the tile. The multi-channel transformer 450 selectively uses pre-defined matrices or custom matrices, and applies efficient compression to the custom matrices. The multi-channel transformer 450 produces side information to the MUX 490 indicating, for example, the multi-channel transforms used and multi-channel transformed parts of tiles.

The quantizer 460 quantizes the output of the multi-channel transformer 450, producing quantized coefficient data to the entropy encoder 470 and side information including quantization step sizes to the MUX 490. In FIG. 4, the quantizer 460 is an adaptive, uniform, scalar quantizer that computes a quantization factor per tile, but the quantizer 460 may instead perform some other kind of quantization.

The entropy encoder 470 losslessly compresses quantized coefficient data received from the quantizer 460, generally as described above with reference to the entropy encoder 260 of FIG. 2.

The controller 480 works with the quantizer 460 to regulate the bitrate and/or quality of the output of the encoder 400. The controller 480 outputs the quantization factors to the quantizer 460 with the goal of satisfying quality and/or bitrate constraints.

The mixed/pure lossless encoder 472 and associated entropy encoder 474 compress audio data for the mixed/pure lossless coding mode. The encoder 400 uses the mixed/pure lossless coding mode for an entire sequence or switches between coding modes on a frame-by-frame, block-by-block, tile-by-tile, or other basis.

The MUX 490 multiplexes the side information received from the other modules of the audio encoder 400 along with the entropy encoded data received from the entropy encoders 470, 474. The MUX 490 includes one or more buffers for rate control or other purposes.

D. Second Audio Decoder

With reference to FIG. 5, the second audio decoder 500 receives a bitstream 505 of compressed audio information. The bitstream 505 includes entropy encoded data as well as side information from which the decoder 500 reconstructs audio samples 595.

The DEMUX 510 parses information in the bitstream 505 and sends information to the modules of the decoder 500. The DEMUX 510 includes one or more buffers to compensate for short-term variations in bitrate due to fluctuations in complexity of the audio, network jitter, and/or other factors.

The entropy decoder 520 losslessly decompresses entropy codes received from the DEMUX 510, typically applying the inverse of the entropy encoding techniques used in the encoder 400. When decoding data compressed in lossy coding mode, the entropy decoder 520 produces quantized spectral coefficient data.

The mixed/pure lossless decoder 522 and associated entropy decoder(s) 520 decompress losslessly encoded audio data for the mixed/pure lossless coding mode.

The tile configuration decoder 530 receives and, if necessary, decodes information indicating the patterns of tiles for frames from the DEMUX 590. The tile pattern information may be entropy encoded or otherwise parameterized. The tile configuration decoder 530 then passes tile pattern information to various other modules of the decoder 500.

The inverse multi-channel transformer 540 receives the quantized spectral coefficient data from the entropy decoder 520 as well as tile pattern information from the tile configuration decoder 530 and side information from the DEMUX 510 indicating, for example, the multi-channel transform used and transformed parts of tiles. Using this information, the inverse multi-channel transformer 540 decompresses the transform matrix as necessary, and selectively and flexibly applies one or more inverse multi-channel transforms to the audio data.

The inverse quantizer/weighter 550 receives information such as tile and channel quantization factors as well as quantization matrices from the DEMUX 510 and receives quantized spectral coefficient data from the inverse multi-channel transformer 540. The inverse quantizer/weighter 550 decompresses the received weighting factor information as necessary. The quantizer/weighter 550 then performs the inverse quantization and weighting.

The inverse frequency transformer 560 receives the spectral coefficient data output by the inverse quantizer/weighter 550 as well as side information from the DEMUX 510 and tile pattern information from the tile configuration decoder 530. The inverse frequency transformer 570 applies the inverse of the frequency transform used in the encoder and outputs blocks to the overlapper/adder 570.

In addition to receiving tile pattern information from the tile configuration decoder 530, the overlapper/adder 570 receives decoded information from the inverse frequency transformer 560 and/or mixed/pure lossless decoder 522. The overlapper/adder 570 overlaps and adds audio data as necessary and interleaves frames or other sequences of audio data encoded with different modes.

The multi-channel post-processor 580 optionally re-matrixes the time-domain audio samples output by the overlapper/adder 570. For bitstream-controlled post-processing, the post-processing transform matrices vary over time and are signaled or included in the bitstream 505.

III. Reversible Modulated Lapped Transform On Variable Subframe Sizes

As discussed above, the representative encoder (e.g., tile configurer 422) encodes the audio signal using a varying subframe sizes, such as to balance between use of smaller subframe sizes for transients in the audio to avoid pre-echo effects and larger subframe sizes for coding efficiency. The encoder can employ varies techniques to adaptively choose the subframe sizes, such as those described by Chen et al., "ADAPTIVE WINDOW-SIZE SELECTION IN TRANSFORM CODING," U.S. Patent Application Publication No. US-2003-0115052-A1.

Figure 6:
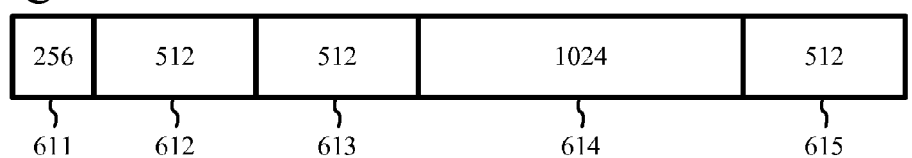
FIG. 6 is a diagram illustrating an example subframe configuration for an audio bitstream.

FIG. 6 illustrates an example subframe configuration produced by the representative encoder, in which a section of the audio samples are partitioned into subframes 611-615 having sizes of 256, 512, 512, 1024 and 512 samples. The subframe sizes shown in FIG. 6 are merely representative of the subframe size choices available in an exemplary encoder implementation, and chosen for purposes of illustration. In various alternative encoder implementations, the encoder can use other subframe sizes, and/or more or fewer choices of subframe size.

As also discussed above, the representative encoder applies a frequency transform to the audio samples (e.g., by the frequency transformer 430). The frequency transform used in the representative encoder is a type of Modulated Lapped Transform (MLT), such as the Modified Discrete Cosine Transform (MDCT). This MLT for each subframe overlaps with samples in prior and subsequent subframes. In other words, the transform takes its input from an overlap portion of the samples in prior and subsequent subframes, in addition to the samples in the current subframe. In this example, an overlap equal to half the size of the smaller subframe (i.e., smaller of the adjacent and current subframe sizes) is used. For example, the overlap for the subframe 612 (which has a size of 512 samples) is 128 samples of the previous subframe 611 (which has a smaller size of 256 samples). On the other hand, the subframe 615 (with 512 samples) is smaller than its previous subframe 614 (with 1024 samples), and therefore uses an overlap of 256 samples of the previous subframe 614. In alternative implementations, the encoder can use an MLT with a different amount of overlap from the prior and subsequent subframe (e.g., one fourth the smaller subframe size, etc.). As can be seen from this example, the choice of three subframe sizes results in a larger number of prior, current and subsequent subframe size combinations, and thereby produces a larger permutation of lapped transform sizes for the subframes.

In the case of lossless compression by the encoder, the MLT desirably has a reversible integer-integer transform implementation. The following description addresses how such reversible integer-integer transform implementations are derived for the various combinations of subframe sizes. The modulated lapped transform for each subframe size combination is produced by factoring into combinations of an overlap windowing transforms 711-714 (shown in FIG. 7) that straddles the subframes, together with a block transform 811-815 (shown in FIG. 8) applied to the subframes.

IV. Factorization of the Modulated Lapped Transform

The following section presents a simple method for understanding and implementing certain lapped orthogonal transforms such as the MLT. The MLT (the real part of the MCLT) can be written as the following orthogonal transform (the negative sign is arbitrary, but is added as it matches the definition of the transform (with the exception of a scale factor) that is in common use in audio codecs.

$$Y[k + Ml] =$$
$$-\sqrt{\frac{2}{M}} \sum_{n=0}^{2M-1} x\left[\frac{n - M}{2} + Ml\right] \sin\left[\left(n + \frac{1}{2}\right)\frac{\pi}{2M}\right] \cos\left[\left(n + \frac{M+1}{2}\right)\left(k + \frac{1}{2}\right)\frac{\pi}{M}\right]$$

In the above formula, the input audio samples are represented by the $$x\left[n - \frac{M}{2} + Ml\right]$$

term. The sin term is a window function, whereas the cos term are the basis functions of the transform. The variable k is a spectral index, M is the subframe size, and l is the index of the subframe.

Because $\cos(-\theta+\pi) = -\cos\theta$, it follows that $$\cos\left[\left(M - 1 - n + \frac{M+1}{2}\right)\left(k + \frac{1}{2}\right)\frac{\pi}{M}\right] =$$
$$\cos\left[\left(-n - \frac{M+1}{2}\right)\left(k + \frac{1}{2}\right)\frac{\pi}{M} + 2M\left(k + \frac{1}{2}\right)\frac{\pi}{M}\right] =$$
$$\cos\left[\left(-n - \frac{M+1}{2}\right)\left(k + \frac{1}{2}\right)\frac{\pi}{M} + (2k + 1)\pi\right] =$$
$$-\cos\left[\left(n + \frac{M+1}{2}\right)\left(k + \frac{1}{2}\right)\frac{\pi}{M}\right]$$

Similarly, because $\cos(-\theta+2\pi) = \cos\theta$, we also know that $$\cos\left[\left(\frac{3M}{2} - 1 - n + \frac{M+1}{2}\right)\left(k + \frac{1}{2}\right)\frac{\pi}{M}\right] =$$
$$\cos\left[\left(-n - \frac{3M}{2} - \frac{M+1}{2}\right)\left(k + \frac{1}{2}\right)\frac{\pi}{M} + 4M\left(k + \frac{1}{2}\right)\frac{\pi}{M}\right] =$$

-continued
$$\cos\left[\left(-n - \frac{3M}{2} - \frac{M+1}{2}\right)\left(k + \frac{1}{2}\right)\frac{\pi}{M} + (4k + 2)\pi\right] =$$
$$\cos\left[\left(\frac{3M}{2} + n + \frac{M+1}{2}\right)\left(k + \frac{1}{2}\right)\frac{\pi}{M}\right]$$

Applying these above two relationships in the MLT formula, we have $$Y[k + Ml] =$$
$$-\sqrt{\frac{2}{M}} \sum_{n=0}^{\frac{M}{2}-1} \left\{ \begin{array}{l} x[n + Ml]\sin\left[\left(n + \frac{M+1}{2}\right)\frac{\pi}{2M}\right] - \\ x[-n - 1 + Ml]\sin\left[\left(-n + \frac{M-1}{2}\right)\frac{\pi}{2M}\right] \end{array} \right\}$$
$$\cos\left[\left(n + M + \frac{1}{2}\right)\left(k + \frac{1}{2}\right)\frac{\pi}{M}\right] -$$
$$\sqrt{\frac{2}{M}} \sum_{n=\frac{M}{2}}^{M-1} \left\{ \begin{array}{l} x[n + Ml]\sin\left[\left(n + \frac{M+1}{2}\right)\frac{\pi}{2M}\right] + \\ x[2M - 1 - n + Ml]\sin\left[\left(-n + \frac{5M-1}{2}\right)\frac{\pi}{2M}\right] \end{array} \right\}$$
$$\cos\left[\left(n + M + \frac{1}{2}\right)\left(k + \frac{1}{2}\right)\frac{\pi}{M}\right]$$

Suppose that a term z[n] is defined as:

$$z[n + Ml] = x[n + Ml]\sin\left[\left(n + \frac{M+1}{2}\right)\frac{\pi}{2M}\right] -$$
$$x[-n - 1 + Ml]\sin\left[\left(-n + \frac{M-1}{2}\right)\frac{\pi}{2M}\right],$$

for $n = 0, \ldots, M/2 - 1$, and $$z[n + Ml] = x[n + Ml]\sin\left[\left(n + \frac{M+1}{2}\right)\frac{\pi}{2M}\right] +$$
$$x[2M - 1 - n + Ml]\sin\left[\left(-n + \frac{5M-1}{2}\right)\frac{\pi}{2M}\right],$$

for $n = M/2, \ldots, M - 1$.

Then, the MLT formula can be written as:

$$Y[k + Ml] = -\sqrt{\frac{2}{M}} \sum_{n=0}^{M-1} z[n + Ml]\cos\left[\left(n + M + \frac{1}{2}\right)\left(k + \frac{1}{2}\right)\frac{\pi}{M}\right] =$$
$$-\sqrt{\frac{2}{M}} \sum_{n=0}^{M-1} z[M - 1 - n + Ml]$$
$$\cos\left[\left(M - 1 - n + M + \frac{1}{2}\right)\left(k + \frac{1}{2}\right)\frac{\pi}{M}\right] =$$
$$-\sqrt{\frac{2}{M}} \sum_{n=0}^{M-1} z[M - 1 - n + Ml]$$
$$\cos\left[\left(-n - \frac{1}{2}\right)\left(k + \frac{1}{2}\right)\frac{\pi}{M} + (2k + 1)\pi\right] =$$
$$\sqrt{\frac{2}{M}} \sum_{n=0}^{M-1} z[M - 1 - n + Ml]\cos\left[\left(n + \frac{1}{2}\right)\left(k + \frac{1}{2}\right)\frac{\pi}{M}\right],$$

which is the type-IV DCT of z[n+Ml] flipped.

As demonstrated by this rewritten formula, the MLT can be thought of as two block based transforms. The first block transform is the overlapping one stage butterfly from x to z, and the second block transform is simply a block based DCT-IV of the z term flipped.

The overlapping region between two adjacent blocks for the MLT consists of the first half of a block l and the second half of block (l−1). Because $$\sin\left(-\theta + \frac{\pi}{2}\right) = \cos\theta,$$

we can write the term z[n+Ml] for this overlapping region as $$z[n+Ml] = x[n+Ml]\sin\left[\left(n+\frac{M+1}{2}\right)\frac{\pi}{2M}\right] -$$
$$x[-n-1+Ml]\sin\left[\left(-n+\frac{M-1}{2}\right)\frac{\pi}{2M}\right] =$$
$$x[n+Ml]\sin\left[\left(n+\frac{M+1}{2}\right)\frac{\pi}{2M}\right] -$$
$$x[-n-1+Ml]\cos\left[\left(n+\frac{M+1}{2}\right)\frac{\pi}{2M}\right] \text{ for } n =$$
$$0, \ldots, M/2-1, \text{ and}$$
$$z[n+Ml-M] = x[n+Ml-M]\sin\left[\left(n+\frac{M+1}{2}\right)\frac{\pi}{2M}\right] +$$
$$x[2M-1-n+Ml-M]\sin\left[\left(-n+\frac{5M-1}{2}\right)\frac{\pi}{2M}\right]$$
$$\text{for } n = M/2, \ldots, M-1.$$

After making the substitution n′=M−1−n and because $$\sin\left(\theta + \frac{\pi}{2}\right) = \cos\theta$$

and sin(−θ+π)=sin θ, we have $$z[-1-n+Ml] = x[-n-1+Ml]\sin\left[\left(-n+\frac{3M-1}{2}\right)\frac{\pi}{2M}\right] +$$
$$x[n+Ml]\sin\left[\left(n+\frac{3M-1}{2}\right)\frac{\pi}{2M}\right] =$$
$$x[-n-1+Ml]\sin\left[\left(n+\frac{M+1}{2}\right)\frac{\pi}{2M}\right] +$$
$$x[n+Ml]\cos\left[\left(n+\frac{M+1}{2}\right)\frac{\pi}{2M}\right]$$

for n=0, . . . , M/2−1.

This is the same as a simple 2×2 transform block with $$\begin{bmatrix} z[n+Ml] \\ z[-1-n+Ml] \end{bmatrix} = \begin{bmatrix} \sin\theta & -\cos\theta \\ \cos\theta & \sin\theta \end{bmatrix} \begin{bmatrix} x[n+Ml] \\ x[-1-n+Ml] \end{bmatrix}$$

where $$\theta = \left(n + \frac{M+1}{2}\right)\frac{\pi}{2M}, n = 0, \ldots, M/2-1.$$

Then, making a further substitution n′=M/2−1−n gives $$\begin{bmatrix} z\left[Ml+\frac{M}{2}-1-n\right] \\ z\left[Ml-\frac{M}{2}+n\right] \end{bmatrix} = \begin{bmatrix} \sin\theta & -\cos\theta \\ \cos\theta & \sin\theta \end{bmatrix} \begin{bmatrix} x\left[Ml+\frac{M}{2}-1-n\right] \\ x\left[Ml-\frac{M}{2}+n\right] \end{bmatrix},$$

where n=0, . . . , M/2−1 and $$\theta = \left(n + \frac{1}{2}\right)\frac{\pi}{2M},$$

and using the fact that sin(−θ+π/2)=cos θ and cos(−θ+π/2)=sin θ. This 2×2 transform can be used as the overlapped windowing block transform 711-714 (FIG. 7) of the audio codec. The transform can be applied to varying subframe sizes by treating each overlapping region as a single stage butterfly. Because the 2×2 rotation in this transform can be made reversible, this overlap windowing transform is easily implemented as a reversible transform.

When the subframe sizes vary (such as for the example illustrated in FIG. 6), only the window shape of the MLT changes. However, the window still obeys all the symmetry properties of the original window. Therefore, the only change when adapting to varying size subframes is the overlapping window size, M.

Figure 7:
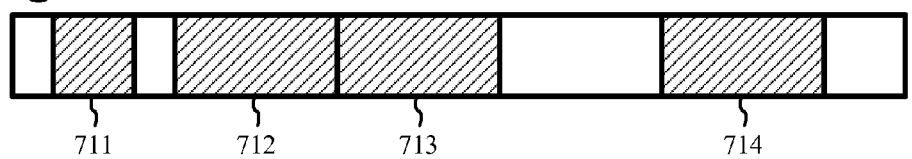
FIG. 7 is a diagram illustrating overlapping regions of the example subframe configuration in FIG. 6 to which an overlap operator part of lapped transforms is applied.
Figure 8:
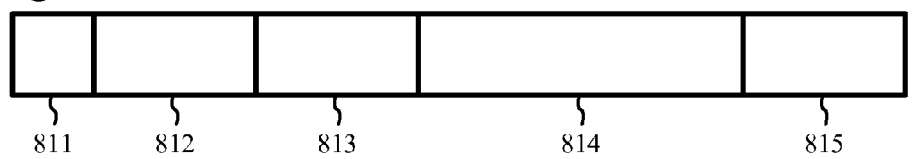
FIG. 8 is a diagram illustrating blocks to which a block transform part of lapped transforms are applied in the example subframe configuration of FIG. 6.

Further, this methodology is more generally applicable to creating overlapped orthogonal transforms by simply applying any orthogonal transform to given blocks within the data, then shifting the blocking grid and applying another orthogonal transform as shown in FIGS. 6-8.

III. Factorization of Generic Overlapping Transforms

Under certain conditions, any transform with no more than 50% overlap between adjacent blocks can be factored into two block transforms. The exact necessary conditions will be explained in the following derivation. Consider a lapped transform which operates on blocks with no more than 50% overlap. Such a linear transform can be written as a matrix where each block in the matrix is a N/2×N/2 matrix, where N is the smallest block size in the transform (if variable block sizes are allowed). For example, suppose a lapped transform is allowed to use 512, 1024, and 2048 size blocks. Then, if the block sizes are 512, 1024, 512, and 512, the transform matrix for a lapped transform can be written as follows:

$$A = \begin{bmatrix} A_{00} & A_{01} & A_{02} & 0 & 0 & 0 & 0 & 0 & 0 & 0 \\ A_{10} & A_{11} & A_{12} & 0 & 0 & 0 & 0 & 0 & 0 & 0 \\ 0 & A_{21} & A_{22} & A_{23} & A_{24} & A_{25} & A_{26} & 0 & 0 & 0 \\ 0 & A_{31} & A_{32} & A_{33} & A_{34} & A_{35} & A_{36} & 0 & 0 & 0 \\ 0 & A_{41} & A_{42} & A_{43} & A_{44} & A_{45} & A_{46} & 0 & 0 & 0 \\ 0 & A_{51} & A_{52} & A_{53} & A_{54} & A_{55} & A_{56} & 0 & 0 & 0 \\ 0 & 0 & 0 & 0 & 0 & A_{65} & A_{66} & A_{67} & A_{68} & 0 \\ 0 & 0 & 0 & 0 & 0 & A_{75} & A_{76} & A_{77} & A_{78} & 0 \\ 0 & 0 & 0 & 0 & 0 & 0 & 0 & A_{87} & A_{88} & A_{89} \\ 0 & 0 & 0 & 0 & 0 & 0 & 0 & A_{97} & A_{98} & A_{99} \end{bmatrix}$$

where each sub-matrix is a 256×256 matrix.

Consider breaking this operation into two steps, the first step being applying an overlapping operator (C), and another operator that applies a block transform on the actual block size (B). Then, we can write these two matrices as:

$$B = \begin{bmatrix} B_{00} & B_{01} & 0 & 0 & 0 & 0 & 0 & 00 & 0 & 0 \\ B_{10} & B_{11} & 0 & 0 & 0 & 0 & 0 & 0 & 0 & 0 \\ 0 & 0 & B_{22} & B_{23} & B_{24} & B_{25} & 0 & 0 & 0 & 0 \\ 0 & 0 & B_{32} & B_{33} & B_{34} & B_{35} & 0 & 0 & 0 & 0 \\ 0 & 0 & B_{42} & B_{43} & B_{44} & B_{45} & 0 & 0 & 0 & 0 \\ 0 & 0 & B_{52} & B_{53} & B_{54} & B_{55} & 0 & 0 & 0 & 0 \\ 0 & 0 & 0 & 0 & 0 & 0 & B_{66} & B_{67} & 0 & 0 \\ 0 & 0 & 0 & 0 & 0 & 0 & B_{76} & B_{77} & 0 & 0 \\ 0 & 0 & 0 & 0 & 0 & 0 & 0 & 0 & B_{88} & B_{89} \\ 0 & 0 & 0 & 0 & 0 & 0 & 0 & 0 & B_{98} & B_{99} \end{bmatrix}$$

and $$C = \begin{bmatrix} I & 0 & 0 & 0 & 0 & 0 & 0 & 0 & 0 & 0 \\ 0 & C_{11} & C_{12} & 0 & 0 & 0 & 0 & 0 & 0 & 0 \\ 0 & C_{21} & C_{22} & 0 & 0 & 0 & 0 & 0 & 0 & 0 \\ 0 & 0 & 0 & I & 0 & 0 & 0 & 0 & 0 & 0 \\ 0 & 0 & 0 & 0 & I & 0 & 0 & 0 & 0 & 0 \\ 0 & 0 & 0 & 0 & 0 & C_{55} & C_{56} & 0 & 0 & 0 \\ 0 & 0 & 0 & 0 & 0 & C_{65} & C_{66} & 0 & 0 & 0 \\ 0 & 0 & 0 & 0 & 0 & 0 & 0 & C_{77} & C_{78} & 0 \\ 0 & 0 & 0 & 0 & 0 & 0 & 0 & C_{87} & C_{88} & 0 \\ 0 & 0 & 0 & 0 & 0 & 0 & 0 & 0 & 0 & I \end{bmatrix}$$

The goal is to find B and C, such that A=BC. Since the nth row of A only depends on the nth row of B, it is sufficient to look at a single block of the transform individually. For example, the third block of the transform can be written as:

$$\begin{bmatrix} A_{65} & A_{66} & A_{67} & A_{68} \\ A_{75} & A_{76} & A_{77} & A_{78} \end{bmatrix} = \begin{bmatrix} B_{66} & B_{67} \\ B_{76} & B_{77} \end{bmatrix} \begin{bmatrix} C_{65} & C_{66} & 0 & 0 \\ 0 & 0 & C_{77} & C_{78} \end{bmatrix}$$
$$= \begin{bmatrix} B_{66}C_{65} & B_{66}C_{66} & B_{67}C_{77} & B_{67}C_{78} \\ B_{76}C_{65} & B_{76}C_{66} & B_{77}C_{77} & B_{77}C_{78} \end{bmatrix}$$

Solving for the first half of the third block of the transform simplifies to solving the following equation:

$$\begin{bmatrix} B_{66} \\ B_{76} \end{bmatrix} \begin{bmatrix} C_{65} & C_{66} \end{bmatrix} = \begin{bmatrix} A_{65} & A_{66} \\ A_{75} & A_{76} \end{bmatrix}$$

This is only solvable if the matrix has the property that $$A_{65}A_{75}^{-1} = A_{66}A_{76}^{-1},$$

or if $A_{ij}=0$ for all i for a given j. There are many solutions to this. Let $B_{66}$ be some arbitrary full rank N/2×N/2 matrix. Then, we get $$C_{65} = B_{66}^{-1} A_{65}$$

$$C_{66} = B_{66}^{-1} A_{66}$$

$$B_{76} = A_{75} B_{66} A_{65}^{-1}$$

The second half of the transform block and other transform blocks in the matrix A can be solved for in a similar manner.

This shows that under certain conditions (i.e., the property $A_{65}A_{75}^{-1} = A_{66}A_{76}^{-1}$), the lapped transform can be written as a product of two block transforms, one which takes care of the overlapping, and another which is a simple block transform.

Accordingly, a reversible integer-integer implementation of a lapped transform for a subframe of an audio signal with varying size subframes is derived by forming a representation of the lapped transform as a rectangular linear transform matrix $$A = \begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

for a subframe of size N. This rectangular linear transform matrix is composed of N/2×N/2 matrix block elements, and i,j are indices of the matrix blocks. Further, the matrix has the property that $A_{i(j-1)}A_{(i+1)(j-1)}^{-1} = A_{ij}A_{(i+1)j}^{-1}$ or $A_{mn}=0$ for all m for a given n. The rectangular linear transform matrix A factors into an overlap windowing transform matrix C in a form of $$\begin{bmatrix} C_{(i-1)(j-1)} & C_{(i-1)j} \\ C_{i(j-1)} & C_{ij} \end{bmatrix}$$

and block transform matrix B in form of $$\begin{bmatrix} B_{ij} & B_{i(j+1)} \\ B_{(i+1)j} & B_{(i+1)(j+1)} \end{bmatrix},$$

the components of which are arrived at by solving the relations:

$$C_{i(j-1)} = B_{ij}^{-1} A_{i(j-1)}$$

$$C_{ij} = B_{ij}^{-1} A_{ij}$$

$$B_{(i+1)j} = A_{(i+1)(j-1)} B_{ij} A_{i(j-1)}^{-1}.$$

In view of the many possible embodiments to which the principles of our invention may be applied, we claim as our invention all such embodiments as may come within the scope and spirit of the following claims and equivalents thereto.

I claim:

1. A method of deriving reversible integer-input/integer-output implementations of a lapped transform for processing an input audio signal partitioned in subframes of plural different sizes, the method comprising:
factorizing the lapped transform into combinations of overlap windowing transforms for an overlap region overlapping adjacent subframes and block transforms for the subframes, wherein said factorizing comprises,
forming a representation of the lapped transform for a given subframe as a rectangular linear transform matrix A, having a form of $$\begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

where each subblock in the matrix is a N/2×N/2 matrix for a size N of the subframe and i, j are indices of the matrix subblocks, and further wherein the matrix has a property that $A_{i(j-1)}A_{(i+1)(j-1)}^{-1}=A_{ij}A_{(i+1)j}^{-1}$;

factoring the rectangular linear transform matrix A into an overlap windowing transform matrix C in a form of $$\begin{bmatrix} C_{(i-1)(j-1)} & C_{(i-1)j} \\ C_{i(j-1)} & C_{ij} \end{bmatrix}$$

and block transform matrix B in form of $$\begin{bmatrix} B_{ij} & B_{i(j+1)} \\ B_{(i+1)j} & B_{(i+1)(j+1)} \end{bmatrix},$$

wherein said factoring comprises solving the relations:

$$C_{i(j-1)}=B_{ij}^{-1}A_{i(j-1)}$$

$$C_{ij}=B_{ij}^{-1}A_{ij}$$

$$B_{(i+1)j}=A_{(i+1)(j-1)}B_{ij}A_{i(j-1)}^{-1};$$

at an audio processor, receiving input of an audio signal with said subframe; and with the audio processor, applying the overlap windowing transform matrix C to said subframe and its preceding adjacent subframe; and with the audio processor, applying the block transform matrix B to said subframe.

2. A method of encoding an audio signal, the method comprising:

receiving input of an audio signal comprising a sequence of time domain audio samples;

partitioning the audio signal into subframes having at least two different subframe sizes;

performing a lapped transform with reversible integer-input to integer-output of the different size subframes, wherein the lapped transforms are realized as a combination of reversible block transforms applied to the subframes that are the respective subframe sizes and reversible block rotation transforms overlapping respective adjacent subframes where each reversible block rotation transform overlaps up to half of the smaller of the overlapped adjacent subframes, wherein the reversible block transform of a subframe and reversible block rotation transforms overlapping with adjacent subframes are a factorization of the lapped transform, wherein the lapped transforms are realized as a combination a rectangular linear transform matrix A, having a form of $$\begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

where each subblock in the matrix is a N/2×N/2 matrix for a size N of the subframe and i,j are indices of the matrix subblocks, and further wherein the matrix has a property that $A_{i(j-1)}A_{(i+1)(j-1)}^{-1}=A_{ij}A_{(i+1)j}^{-1}$;

a factorization of the rectangular linear transform matrix A into an overlap windowing transform matrix C in a form of $$\begin{bmatrix} C_{(i-1)(j-1)} & C_{(i-1)j} \\ C_{i(j-1)} & C_{ij} \end{bmatrix}$$

and a block transform matrix B in form of $$\begin{bmatrix} B_{ij} & B_{i(j+1)} \\ B_{(i+1)j} & B_{(i+1)(j+1)} \end{bmatrix},$$

wherein the matrices A, B, C satisfy the relations:

$$C_{i(j-1)}=B_{ij}^{-1}A_{i(j-1)}$$

$$C_{ij}=B_{ij}^{-1}A_{ij};$$

$$B_{(i+1)j}=A_{(i+1)(j-1)}B_{ij}A_{i(j-1)}^{-1};$$

and encoding the resulting transform coefficients as a compressed bitstream.

3. The method of claim 2, wherein the lapped transform is a modulated lapped transform.

4. The method of claim 3, wherein the lapped transform is a modified discrete cosine transform.

5. The method of claim 4, wherein the block transform is a block-based DCT-IV type transform and the overlap transform is a single stage butterfly type transform.

6. A method of decoding an audio signal, the method comprising:

decoding transform coefficients of an audio signal partitioned in different size subframes;

performing a lapped transform with reversible integer-input to integer-output of the different size subframes, wherein the lapped transforms are realized as a combination of reversible block transforms applied to the subframes that are the respective subframe sizes and reversible block rotation transforms overlapping respective adjacent subframes where each reversible block rotation transform overlaps up to half of the smaller of the overlapped adjacent subframes, wherein the reversible block transform of a subframe and reversible block rotation transforms overlapping with adjacent subframes are a factorization of the lapped transform;

producing audio samples for a time domain audio signal from the inverse transformed transform coefficients; and outputting the audio signal, wherein the lapped transforms are realized as a combination a rectangular linear transform matrix A, having a form of $$\begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

where each subblock in the matrix is a N/2×N/2 matrix for a size N of the subframe and i,j are indices of the matrix subblocks, and further wherein the matrix has a property that $$A_{i(j-1)}A_{(i+1)(j-1)}^{-1}=A_{ij}A_{(i+1)j}^{-1};$$

a factorization of the rectangular linear transform matrix A into an overlap windowing transform matrix C in a form of $$\begin{bmatrix} C_{(i-1)(j-1)} & C_{(i-1)j} \\ C_{i(j-1)} & C_{ij} \end{bmatrix}$$

and a block transform matrix B in form of $$\begin{bmatrix} B_{ij} & B_{i(j+1)} \\ B_{(i+1)j} & B_{(i+1)(j+1)} \end{bmatrix},$$

wherein the matrices A, B, C satisfy the relations:

$$C_{i(j-1)} = B_{ij}^{-1} A_{i(j-1)}$$

$$C_{ij} = B_{ij}^{-1} A_{ij};$$

$$B_{(i+1)j} = A_{(i+1)(j-1)} B_{ij} A_{i(j-1)}^{-1}.$$

7. The method of claim 6, wherein the lapped transform is a modulated lapped transform.

8. The method of claim 7, wherein the lapped transform is a modified discrete cosine transform.

9. The method of claim 8, wherein the block transform is a block-based DCT-IV type transform and the overlap transform is a single stage butterfly type transform.

10. A method of processing an input audio signal partitioned in subframes of plural different sizes, the method comprising:
representing the lapped transform as a factorization into combinations of overlap windowing transforms for an overlap region overlapping adjacent subframes and block transforms for the subframes, wherein said factorization comprises,
representing the lapped transform for a given subframe as a rectangular linear transform matrix A, having a form of $$\begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

where each subblock in the matrix is a N/2×N/2 matrix for a size N of the subframe and i,j are indices of the matrix subblocks, and further wherein the matrix has a property that $$A_{i(j-1)} A_{(i+1)(j-1)}^{-1} = A_{ij} A_{(i+1)j}^{-1};$$

representing the rectangular linear transform matrix A as a factorization into an overlap windowing transform matrix C in a form of $$\begin{bmatrix} C_{(i-1)(j-1)} & C_{(i-1)j} \\ C_{i(j-1)} & C_{ij} \end{bmatrix},$$

and a block transform matrix B in form of $$\begin{bmatrix} B_{ij} & B_{i(j+1)} \\ B_{(i+1)j} & B_{(i+1)(j+1)} \end{bmatrix},$$

wherein:

$$C_{i(j-1)} = B_{ij}^{-1} A_{i(j-1)}$$

$$C_{ij} = B_{ij}^{-1} A_{ij}$$

$$B_{(i+1)j} = A_{(i+1)(j-1)} B_{ij} A_{i(j-1)}^{-1};$$

with an audio processor, receiving input of an audio signal with said subframe; and
with the audio processor, applying the overlap windowing transform matrix C to said subframe and its preceding adjacent subframe; and
with an audio processor, applying the block transform matrix B to said subframe.

11. The method of claim 10, wherein the lapped transform is a modulated lapped transform.

12. A method of encoding an audio signal, the method comprising:
receiving input of an audio signal comprising a sequence of time domain audio samples;
partitioning the audio signal into subframes having at least two different subframe sizes;
performing a lapped transform with reversible integer-input to integer-output of the different size subframes, wherein the lapped transforms are realized by applying an overlap operator followed by a block transform operator, wherein overlap operator and the block transform operator correspond to a factorization of the lapped transform, and the block transform operator is based on a subframe size associated with the subframes to be overlapped;
encoding the resulting transform coefficients as a compressed bitstream, wherein the overlap operator and the block transform operator are representable as an overlap matrix and a block transform matrix, respectively, and the transform for a given subframe can be represented as a rectangular linear transform matrix A, having a form of $$\begin{bmatrix} A_{i(j-1)} & A_{ij} & A_{i(j+1)} & A_{i(j+2)} \\ A_{(i+1)(j-1)} & A_{(i+1)j} & A_{(i+1)(j+1)} & A_{(i+1)(j+2)} \end{bmatrix}$$

wherein each subblock in the matrix is an N/2×N/2 matrix for a size N of the subframe and i,j are indices of the matrix subblocks, and further wherein the matrix has a property that $A_{i(j-1)} A_{(i+1)(j-1)}^{-1} = A_{ij} A_{(i+1)j}^{-1}$; and
the overlap operator can be represented as an overlap matrix C as $$\begin{bmatrix} C_{(i-1)(j-1)} & C_{(i-1)j} \\ C_{i(j-1)} & C_{ij} \end{bmatrix},$$

and the block transform operator can be represented as a matrix B as $$\begin{bmatrix} B_{ij} & B_{i(j+1)} \\ B_{(i+1)j} & B_{(i+1)(j+1)} \end{bmatrix},$$

wherein:

$$C_{i(j-1)} = B_{ij}^{-1} A_{i(j-1)}$$

$$C_{ij} = B_{ij}^{-1} A_{ij}$$

$$B_{(i+1)j} = A_{(i+1)(j-1)} B_{ij} A_{i(j-1)}^{-1}.$$

13. A method of encoding an audio signal, the method comprising:

receiving input of an audio signal comprising a sequence of time domain audio samples;

partitioning the audio signal into subframes having at least two different subframe sizes wherein a minimum subframe size is an even integer N>4;

performing a lapped transform with reversible integer-input to integer-output of the different size subframes, wherein the lapped transforms are realized by applying an overlap operator followed by a block transform operator, wherein the overlap operator and the block transform operator correspond to a factorization of the lapped transform into an overlap matrix comprising an array of N/2 by N/2 overlap submatrices and a block transform matrix comprising an array of N/2 by N/2 transform submatrices, and the block transform operator is based on a subframe size associated with the subframes to be overlapped; and encoding the resulting transform coefficients as a compressed bitstream.

14. The method of claim 13, wherein the lapped transform is a modulated lapped transform.

15. The method of claim 14, wherein the lapped transform is a modified discrete cosine transform.

16. The method of claim 15, wherein the block transform is a block-based DCT-IV type transform and the overlap transform is a single stage butterfly type transform.

17. The method of claim 13, wherein the minimum subframe size N is 256, 512, 1024, or 2048.

18. The method of claim 17, wherein the lapped transform for a subframe is factorized into different size overlap matrices for overlapping previous and subsequent adjacent subframes in a case that said preceding adjacent subframe and subsequent adjacent subframe are different sizes.

19. The method of claim 17, wherein the overlap operator is configured to produce an overlap corresponding to one half a subframe size for a smaller of two frames to be overlapped by the overlap operator.

20. The method of claim 13, wherein a portion of the block transform matrix corresponding to a sub-frame of size MN, wherein M is an even integer, is representable as a submatrix comprising M rows and M+2 columns of N/2 by N/2 transform submatrices.

* * * * *